United States Patent
Bacon (10) Patent No.: US 9,377,134 B2
(45) Date of Patent: Jun. 28, 2016

(54) HANGER FOR AN ELONGATE ARTICLE

(71) Applicant: Gripple Limited, Sheffield, South Yorkshire (GB)

(72) Inventor: Matthew Steven Bacon, Essex (GB)

(73) Assignee: Gripple Limited (GB)

( * ) Notice: Subject to any disclaimer, the term of this patent is extended or adjusted under 35 U.S.C. 154(b) by 0 days.

(21) Appl. No.: 14/416,531

(22) PCT Filed: Jul. 4, 2013

(86) PCT No.: PCT/GB2013/000291
§ 371 (c)(1),
(2) Date: Jan. 22, 2015

(87) PCT Pub. No.: WO2014/020294
PCT Pub. Date: Feb. 6, 2014

(65) Prior Publication Data
US 2015/0176726 A1    Jun. 25, 2015

(30) Foreign Application Priority Data

| Aug. 2, 2012 | (GB) | 1213779.0 |
| Jan. 18, 2013 | (GB) | 1300899.0 |
| Jun. 18, 2013 | (GB) | 1310856.8 |
| Jun. 28, 2013 | (GB) | 1311635.5 |

(51) Int. Cl.
| F16L 3/08 | (2006.01) |
| F16L 3/12 | (2006.01) |
| F16L 3/127 | (2006.01) |
| F16L 3/13 | (2006.01) |
| F16L 3/133 | (2006.01) |
| H02G 3/32 | (2006.01) |
| F16L 3/10 | (2006.01) |

(52) U.S. Cl.
CPC ............. *F16L 3/1222* (2013.01); *F16L 3/1075* (2013.01); *F16L 3/1083* (2013.01); *F16L 3/127* (2013.01); *F16L 3/1215* (2013.01); *F16L 3/13* (2013.01); *F16L 3/133* (2013.01); *H02G 3/32* (2013.01)

(58) Field of Classification Search
CPC ..... F16L 3/1222; F16L 3/1075; F16L 3/1083; F16L 3/1215; F16L 3/127; F16L 3/13; F16L 3/133; H02G 3/32
USPC ........ 248/74.4, 229.13, 229.23, 228.4, 230.4, 248/231.51, 62
See application file for complete search history.

(56) References Cited

U.S. PATENT DOCUMENTS

| 978,912 A | 12/1910 | Mack |
| 1,612,959 A | 1/1927 | Zifferer |

(Continued)

FOREIGN PATENT DOCUMENTS

| AR | 063593 | 2/2009 |
| AT | 380 132 | 4/1986 |

(Continued)

*Primary Examiner* — Anita M King
(74) *Attorney, Agent, or Firm* — Clark Hill PLC (57) ABSTRACT

A hanger (10) for an elongate article comprises an article holding arrangement, which includes a first part (16) mountable on a support, and a second part (18) movably connected to the first part. The second part (18) is moveable relative to the first part (16) between open and closed positions. A securing arrangement is provided for securing the second part (18) in the closed position. A closing member (36) is operable by the article to move the second part (18) to the closed position.

17 Claims, 11 Drawing Sheets

(56) References Cited

U.S. PATENT DOCUMENTS

| | | | | |
|---|---|---|---|---|
| 1,773,838 | A | * | 8/1930 | Zifferer .................. F16L 3/11 248/62 |
| 3,600,770 | A | * | 8/1971 | Halling ................ B65D 45/32 24/279 |
| 3,797,078 | A | * | 3/1974 | LaPointe ............... F16L 23/10 24/279 |
| 3,797,079 | A | * | 3/1974 | Nixon ................. F16L 3/1075 24/285 |
| 4,101,103 | A | * | 7/1978 | Mooney ................. F16L 3/11 248/305 |
| 5,454,606 | A | * | 10/1995 | Voss ..................... F16L 23/10 24/279 |
| 5,509,702 | A | * | 4/1996 | Warehime ............ F16L 23/10 24/279 |
| 5,645,303 | A | * | 7/1997 | Warehime ............ F16L 23/10 24/279 |
| 6,138,960 | A | * | 10/2000 | Carbonare .............. F16L 3/11 248/62 |
| 8,465,060 | B2 | * | 6/2013 | Peet ..................... F16L 23/08 285/407 |
| D723,362 | S | * | 3/2015 | Bacon ...................... D8/396 |
| 2007/0152108 | A1 | * | 7/2007 | Wilson ................ F16L 3/1025 248/58 |
| 2011/0084178 | A1 | | 4/2011 | Wiedner et al. |

FOREIGN PATENT DOCUMENTS

| | | |
|---|---|---|
| DE | 20 2007 014 958 | 2/2008 |
| EP | 2 112 413 | 10/2009 |
| JP | 10-299950 | 11/1998 |
| JP | 2000-291832 | 10/2000 |
| JP | 2003-329172 | 11/2003 |
| JP | 2004-060800 | 2/2004 |
| JP | 2010-281369 | 12/2010 |

* cited by examiner

HANGER FOR AN ELONGATE ARTICLE

This invention relates to hangers for elongate articles. More particularly, but not exclusively, this invention relates to pipe hangers.

Pipes are often suspended by the use of clips which fit around the pipe. In order to assemble the pipes within the clip, the clips are first arranged in position, and the pipe then fed through lengthwise. This can cause problems where, for example, space is restricted.

According to one aspect of this invention, there is provided a hanger for an elongate article, said hanger comprising: an article holding arrangement comprising a first part mountable on a support, and a second part movably connected to the first part, the second part being moveable relative to the first part between open and closed positions; a securing arrangement for securing the second part in the closed position; and a closing member operable by the article to move the second part to the closed position.

In one embodiment, the holding arrangement may define an article receiving space to receive the article therethrough. In this embodiment, the holding arrangement may define an access opening to allow the article access to the article receiving space, when the second part is in the open position. The first part may define the access opening, so that, when the second part is in the open position, the article can be moved through the access opening to be received in the article receiving space.

The second part may comprise a barrier member to extend across the access opening when the second part is in the closed position. The barrier member may be elongate.

The closing member may comprise a lever, which may be operable by engagement of the article therewith to move the second part to the closed position. The closing member may extend across the article receiving space when the second part is in the open position. Thus, when the second part is in the open position, the closing member may be positioned to engage the article when the article is moved into the space.

In the embodiments described herein, the closing member provides the advantage that the article is used to move the second part to the closed position when the article is moved into the space, thereby obviating the need to separately move the second part to the closed position after the article is moved into the space.

The first part may include a cross member on which a component of the securing arrangement is provided. The cross member may engage the second part when the second part is in the closed position. The cross member may have a free end region. Said component of the securing arrangement may be provided adjacent the free end region of the cross member.

The securing arrangement may comprise an engaging formation, which may be provided on the second part. The engaging formation may be provided on the barrier member.

In the first embodiment, the securing arrangement may include a fixed pin member, which may be provided on the first part. The securing arrangement may include opposed forked securing members, which may be in the form of wall members. The fixed pin member may extend between the forked securing members.

In the first embodiment, the engaging formation may comprise a hook member. The hook member may cooperate with the fixed pin member when the second part is in the closed position. The hook member may engage the fixed pin member when the second part is in the closed position. In the first embodiment, the hook member may define a recess to receive the fixed pin member. In the first embodiment, the recess may face towards the article receiving space when the fixed pin member is received in the recess.

In the first embodiment, the securing arrangement may further include a moveable securing element to secure the second part in the closed position. The moveable securing element may be held by the first part and may be slidably moveable relative thereto between securing and non-securing positions. The moveable securing element may extend between the opposed forked securing members.

The securing element may comprise a securing pin element. The securing pin element may be moveable between securing and non-securing positions.

The engaging formation may include an urging surface to engage the securing element and move the securing element to the non-securing position when the second part is moved to the closed position.

The engaging formation may be configured to cooperate with the securing element when the second part is in the closed position to secure the second part in the closed position.

In a second embodiment, the securing arrangement may comprise a detent arrangement, which may comprise detent member. The detent member may comprise a hook portion.

The detent member may be resiliently deformable, and may comprise a spring member. The detent member may be provided on the first part. Desirably, the detent member is provided at the free end region of the cross member.

The detent arrangement may further include a cooperating portion to cooperate with the detent member. The cooperating portion may be provided on the second part. Conveniently, the cooperating portion is provided on the barrier member.

The cooperating portion may define an aperture or recess to receive the detent member when the second part is in the closed position.

In the second embodiment, the securing arrangement may further include a subsidiary securing member to interact with the cooperating portion and secure the second part in the closed position when the first part is deformed by the weight of the article thereon. The subsidiary securing member may comprise an upstanding member, which may be provided on the first member.

The upstanding member may be received in the aperture or recess defined in the cooperating portion when the first part is deformed by the weight of the article thereon. The upstanding member may comprise a pin.

The upstanding member may be offset from the detent member. The upstanding member may be offset from the detent member towards the free end of the cross member. The position of the upstanding member is arranged so that, when the first part is deformed by the weight of the article thereon, the upstanding member is received in the aperture or recess defined in the cooperating portion on the second part.

In a third embodiment, the securing arrangement may comprise a movable securing element. The engaging formation may comprise a hook member. The engaging formation may cooperate with the movable securing element when the second part is in the closed position. The engaging formation may engage the movable securing element when the second part is in the closed position.

In the third embodiment, the engaging formation may define a recess to receive the movable securing element. In the third embodiment, the recess may face away from the article receiving space when the movable securing element is received in the recess.

In the third embodiment, the securing arrangement may comprise a retaining formation to retain the movable securing element. The retaining formation may comprise a fold over portion, which may be a fold over portion of the first part. The free end region of the cross member may comprise the retaining formation. The movable securing element may be elongate, and may have flange portions at opposite ends thereof to hold the securing element in the free end region of the cross member.

In the third embodiment, the securing free end region of the cross member may define an aperture through which the engaging formation can extend to cooperate with the movable securing element when the second part is in the closed position.

The securing arrangement may include a support member to support the movable securing element in a position so that the movable securing element can cooperate with the engaging formation. The support member may comprise a central portion and a respective upstanding member at each end to engage the movable securing element.

The second part may further include the closing member, which may be provided on the barrier member. The closing member may extend transverse to the barrier member.

The closing member may be curved to define a recess. The recess may be configured to receive the article.

The first part may include an article carrying portion, which may define a recess. The article carrying portion may conform to the curvature of the closing member. The article carrying portion may be curved to define the recess.

The article carrying portion may be configured to receive the closing member when the second part is in the closed position. The article carrying portion may comprise two forked members extending substantially parallel to each other. The closing member may be received between the forked members when the second part is in the closed position.

The second part may be pivotally connected to the first part, so that the second part is pivotally moveable between the open and closed positions. The holding arrangement may include a stop member to hold the second part in the open position. The open position of the second part may be a position at which the second part can support the article.

The securing arrangement and the engaging formation may be positioned to cooperate with each other to support the second part when the second part is in the closed position.

An embodiment of the invention will now be described by way of example only, with reference to the accompanying drawings, in which.

FIGS. 1 to 10 of the drawings show a first embodiment of a hanger 10 for an elongate article in the form of a pipe 12. The hanger 10 comprises a holding arrangement 14, which comprises a first part 16 and a second part 18 pivotally attached to the first part 16. The holding arrangement 14 further include mounting means in the form of first and second apertures 20, 22 to allow the hanger 10 to be mounted on a support, for example a strut in a roof.

Figure 1:
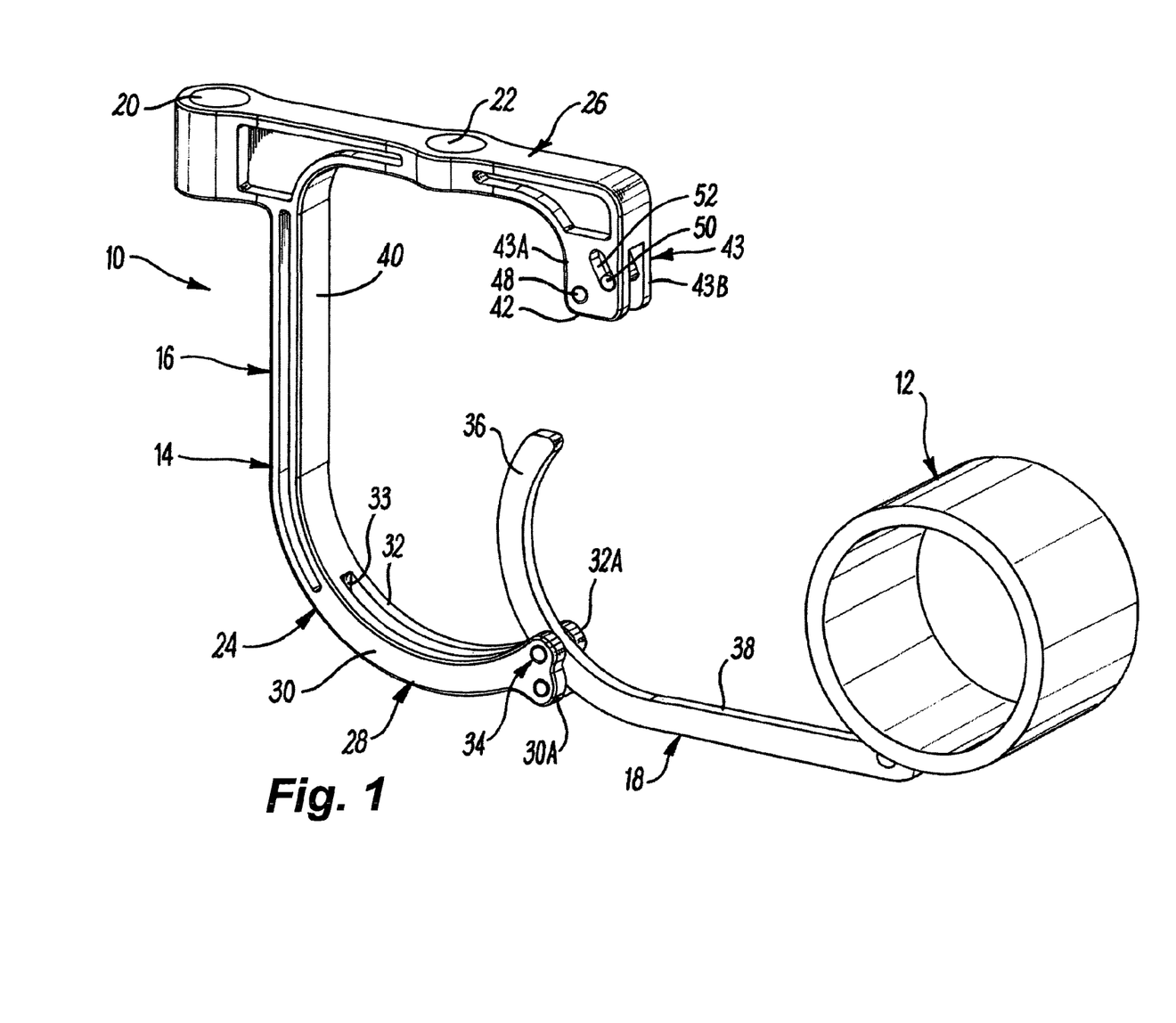
FIG. 1 shows a perspective view of a first embodiment of a hanger for an elongate article, comprising first and second parts, the second part being in an open position.

The first part 16 comprises a first J shaped member 24, attached at its upper end to a substantially horizontal cross member 26. The cross member 26 defines the apertures 20, 22, and has a free end region 43 comprising opposed forked securing members 43A, 43B.

At the lower end of the first J shaped member 24, there is provided an article carrying portion 28 comprising a pair of curved substantially parallel forked receiving members 30, 32 having respective second free end regions 30A, 32A. The forked receiving members 30, 32 define a gap 33 therebetween.

The second part 18 is in the form of a second J shaped member, which is pivotally attached to the second free end regions 30A, 32A at a pivot arrangement 34.

The second part 18 comprises a curved closing member 36 and a barrier member 38. The closing member 36 is in the form of a lever operable by engagement with the pipe 12. The barrier member 38 has a securable end region 39. The second part 18 is pivotally connected to the first part 16 at a region between the closing member 36 and the barrier member 38. The second part 18 is pivotally connected to the first part 16 by the pivot arrangement 34 between the closing member 36 and the barrier member 38.

Figure 3:
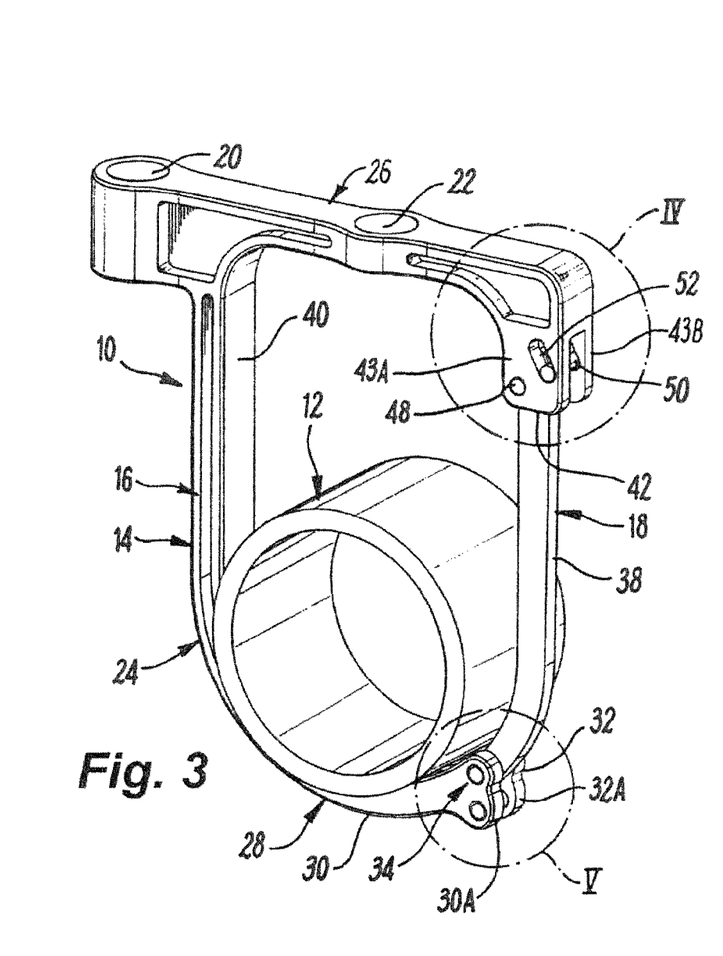
FIG. 3 shows a view similar to FIG. 2 with the second part in the closed position.
Figure 6:
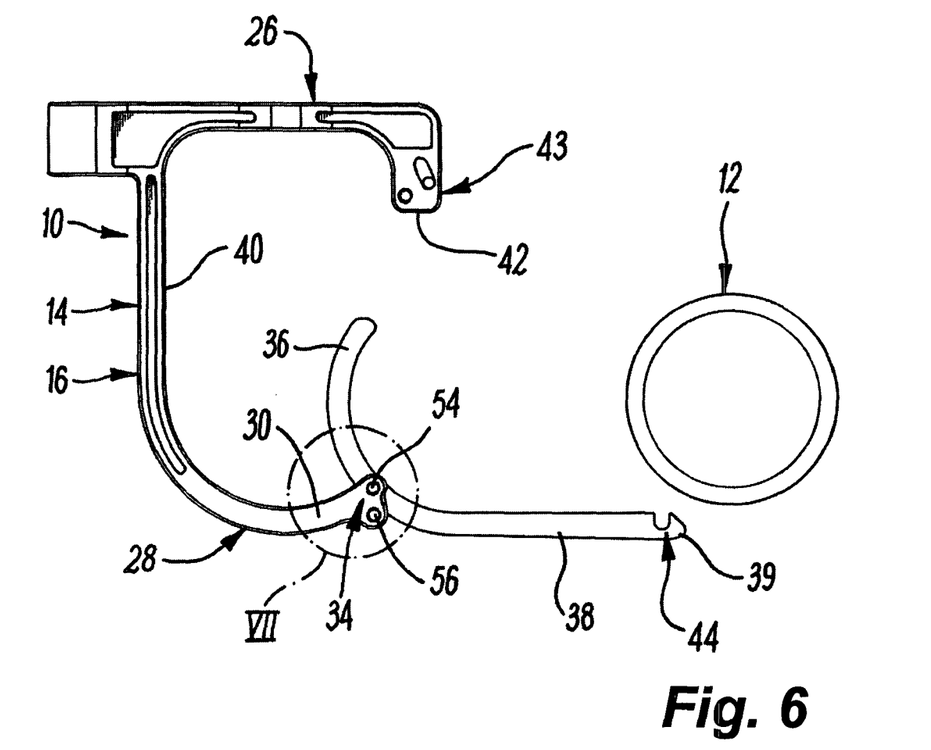
FIG. 6 is a front view of the hanger with the second part in the open position.
Figure 9:
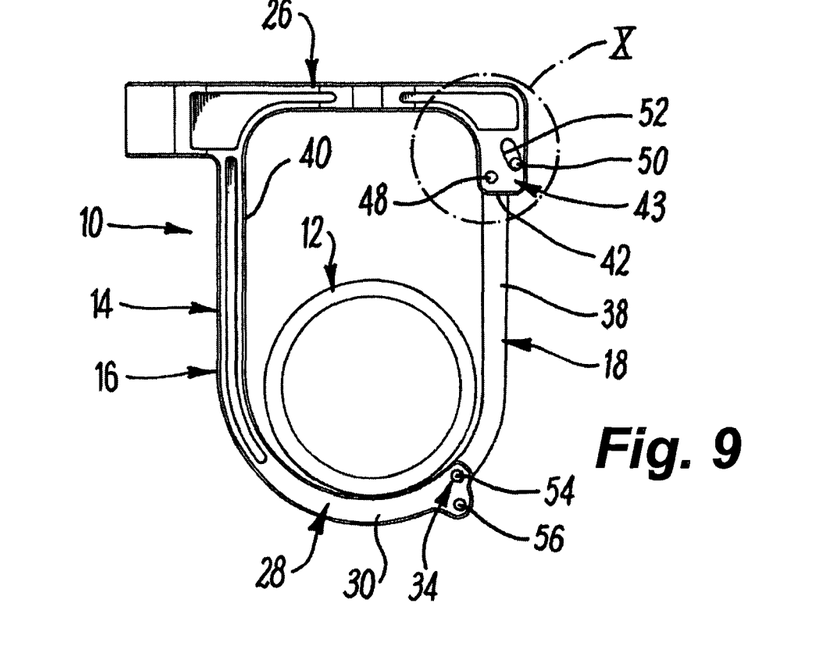
FIG. 9 is a front view of the hanger with the second part in the closed position.

The second part 18 is pivotally movable between an open position shown in FIGS. 1 and 6, and a closed position shown in FIGS. 3 and 9.

The holding arrangement 14 defines a space 40 in which the pipe 12 is received. When the second part 18 is in the open position, an access opening 42 is defined by the holding arrangement 14, through which the pipe 12 passes when it is moved to be received in the space 40. The access opening 42 is defined between the free end region 43 of the cross member 26 and the free end regions 30A, 32A of the forked receiving members 30, 32.

Figure 2:
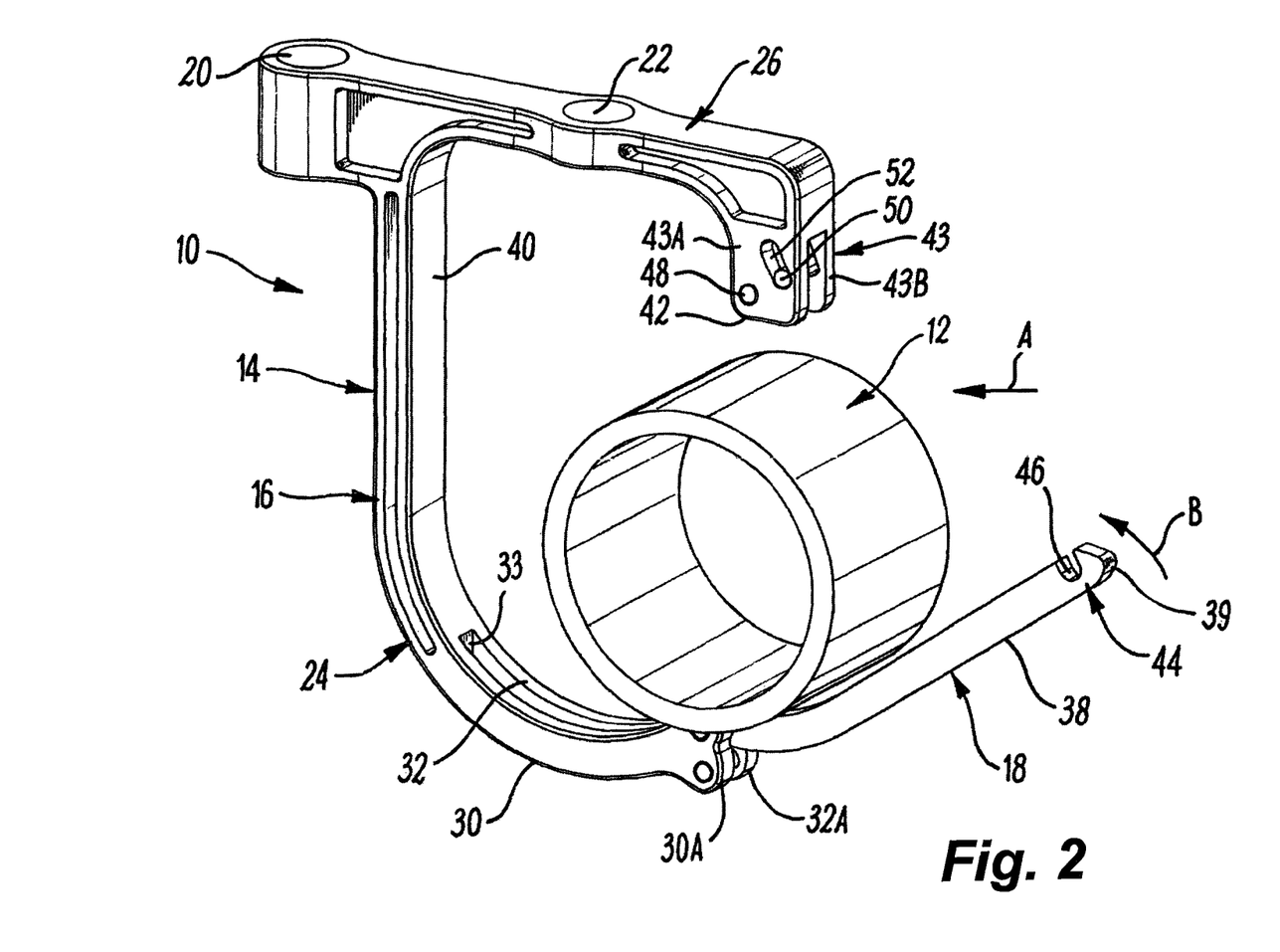
FIG. 2 shows a view similar to FIG. 1, with the second part in a position between the open and a closed position.
Figure 8:
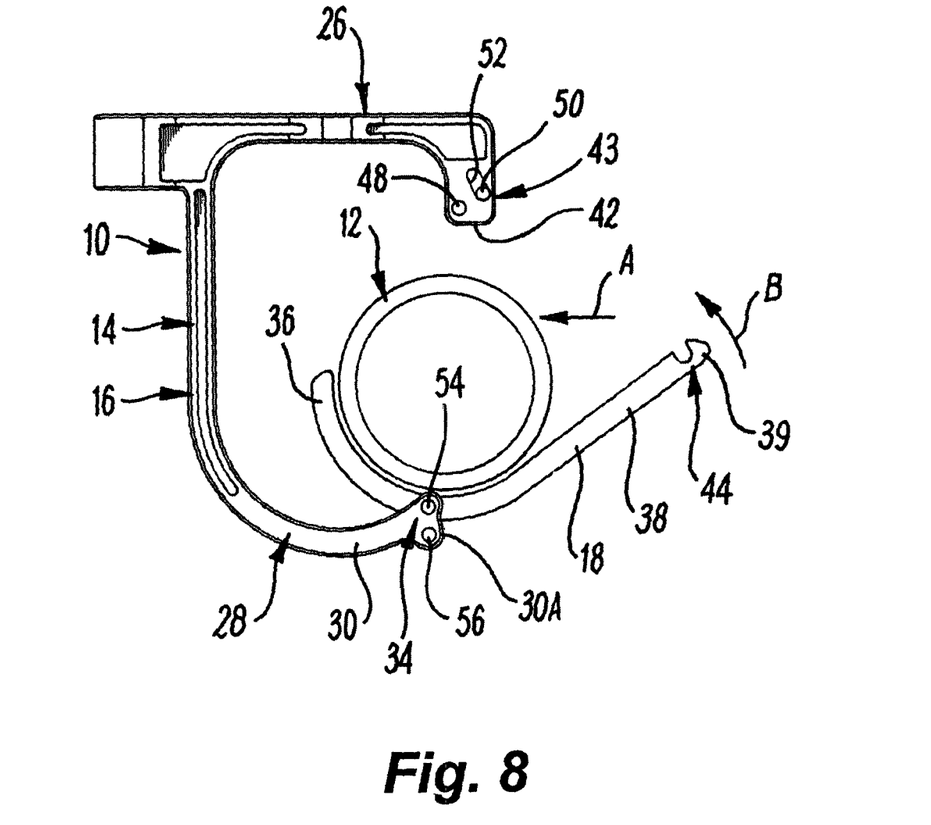
FIG. 8 is a front view of the hanger with the second part in a position between the open and closed positions.

FIGS. 2 and 8 show the movement of the pipe 12 into the space 42. As the pipe 12 moves along the second part 18, as indicated by the arrow A, it engages the closing member 36.

Further movement of the pipe 12 in the direction indicated by the arrow A into the space 40 causes the second part 18 to be pivoted in the direction indicated by the arrow B from the open position to the closed position, as shown in FIGS. 3 and 9. Thus, the engagement of the pipe with the closing member 36 causes the second part 18 to move from the open position to the closed position. In the closed position, the barrier member 38 extends across the gap 42, thereby holding the pipe in the space 40.

Thus, the engagement of the pipe 12 with the closing member 36 as the pipe 12 is moved into the space 40 causes the barrier member 38 to move to the closed position.

Figure 10:
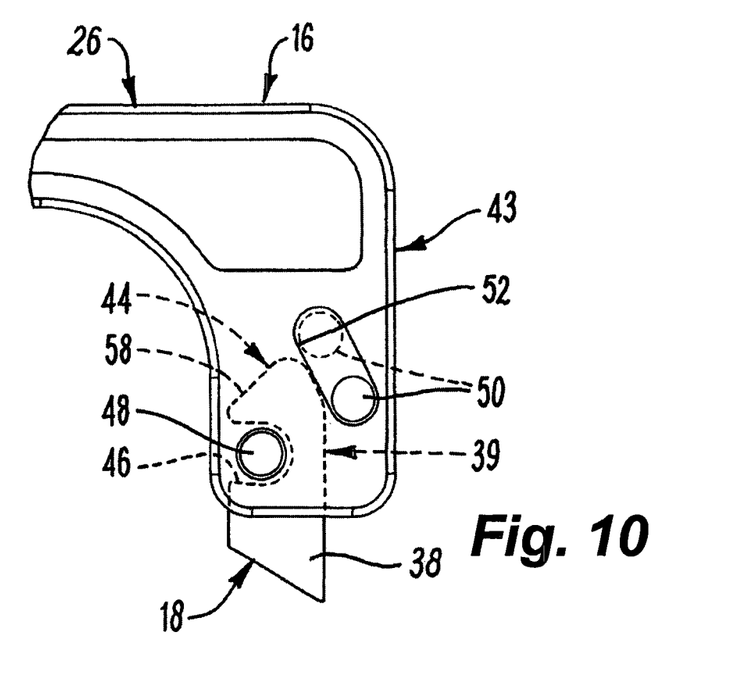
FIG. 10 is a close up view of the region marked X in FIG. 9.

The second part 18 includes an engaging formation in the form of a hook member 44, visible in FIGS. 2, 6 and 10. The hook member 44 is provided at the securable end region 39 of the barrier member 38, and defines a recess 46, the purpose of which is explained below. The hook member 44 is part of a securing arrangement, which secures the second part 18 in the closed position. Other components of the securing arrangement are described below.

Figures 4, 5:
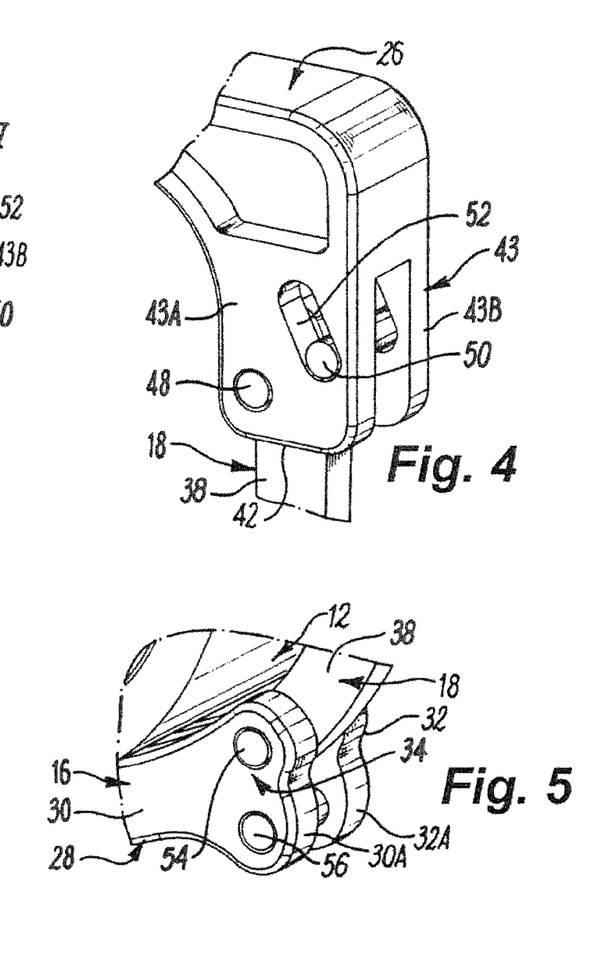
FIG. 4 shows a close up view of the region marked IV in FIG. 3.
FIG. 5 shows a close up view of the region marked V in FIG. 3.

Reference is now made to FIGS. 4 and 10, which show the free end region 43 of the cross member 26. The securing arrangement further includes a fixed pin member 48 and a slidable securing pin element 50. The slidable securing pin element 50 is slidable within, and along, aligned slots 52 defined opposite each other in the forked securing members 43A, 43B. The fixed pin member 48 and the slidable securing pin element 50 are shown in more detail in FIGS. 4 and 10, and explained below.

FIG. 10 shows the securing arrangement 50 in more detail. When the second part 18 is in the closed condition, the hook member 44 engages over the fixed pin member 48, with the fixed pin member 48 being received in the recess 46 defined by the hook member 44. In this position, the fixed pin member 48 provides support to the second part 18, thereby carrying some of the weight of the pipe 12.

When the second part 18 is in the closed position, the securing pin element 50 is in a securing position, shown in FIG. 10, in which the hook member 44 is received between the forked securing members 43A, 43B.

In the first embodiment shown, the slidable securing pin element 50 can be slid from the securing position shown in solid lines in FIG. 10 to a non-securing position shown in broken lines in FIG. 10. In order to move the securing pin element 50 from the securing position to the non-securing position, to allow the hook member 44 to engage the fixed pin member 48, the hook member 44 is provided with an urging surface 58.

As the second part 18 moves towards the closed position, the urging surface 58 engages the slidable securing pin element 50 in the securing position, and pushes it upwardly to the non-securing position shown in broken lines in FIG. 10. This allows the hook member 44 to engage the fixed pin member 48 so that the fixed pin member 48 is received in the recess 46 defined by the hook member 44.

When the fixed pin member 48 is received in the recess 46, the slidable securing pin element 50 slides back along the slots 52 to return to the securing position to secure the second part 18 in the closed position.

When the second part 18 is in the closed position, the closing member 36 is received between the two forked members 30, 32.

Figure 7:
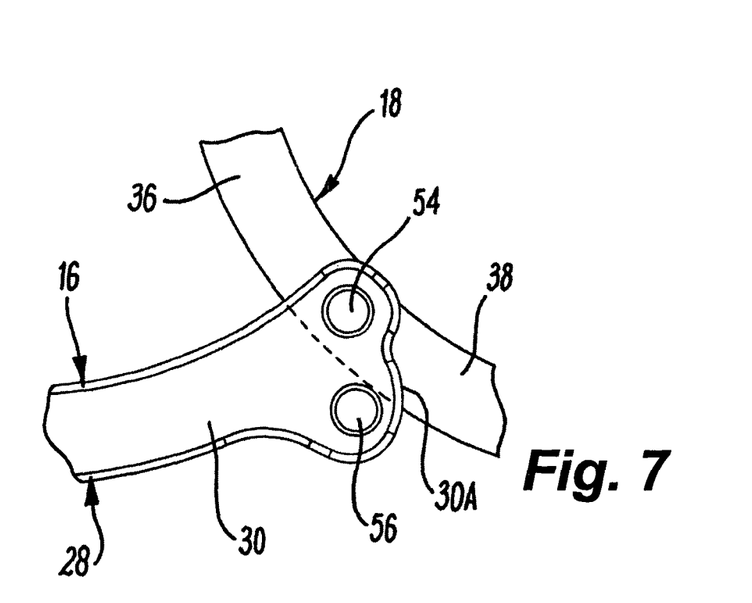
FIG. 7 shows a close up view of the region marked VII in FIG. 6.

Referring to FIGS. 5 and 7, there are shown close-ups of the pivot arrangement 34, which comprises a pivot member 54 which extends between the two forked members 30, 32 and through the second part 18. Thus, the second part 18 is can pivot relative to the first part 16.

The pivot arrangement 34 also includes a stop member 56 which extends between the two forked members 30, 32. When the second part 18 is in the open position shown in FIG. 1, the second part 18 engages the stop member 56 so that the barrier member 38 is held in a horizontal position to support the pipe 12 when the second part 16 is in the open position.

When the second part 18 is in the closed position, the closing member 36 is received in the gap 33 between the two forked receiving members 30, 32.

The hanger 10 can be used to support any suitable elongate article, for example a pipe 10 as described above or cabling. The hanger 10 could be used, for example, to support the piping of a sprinkler system in a building.

Various modifications can be made without departing from the scope of the invention.

Figure 11:
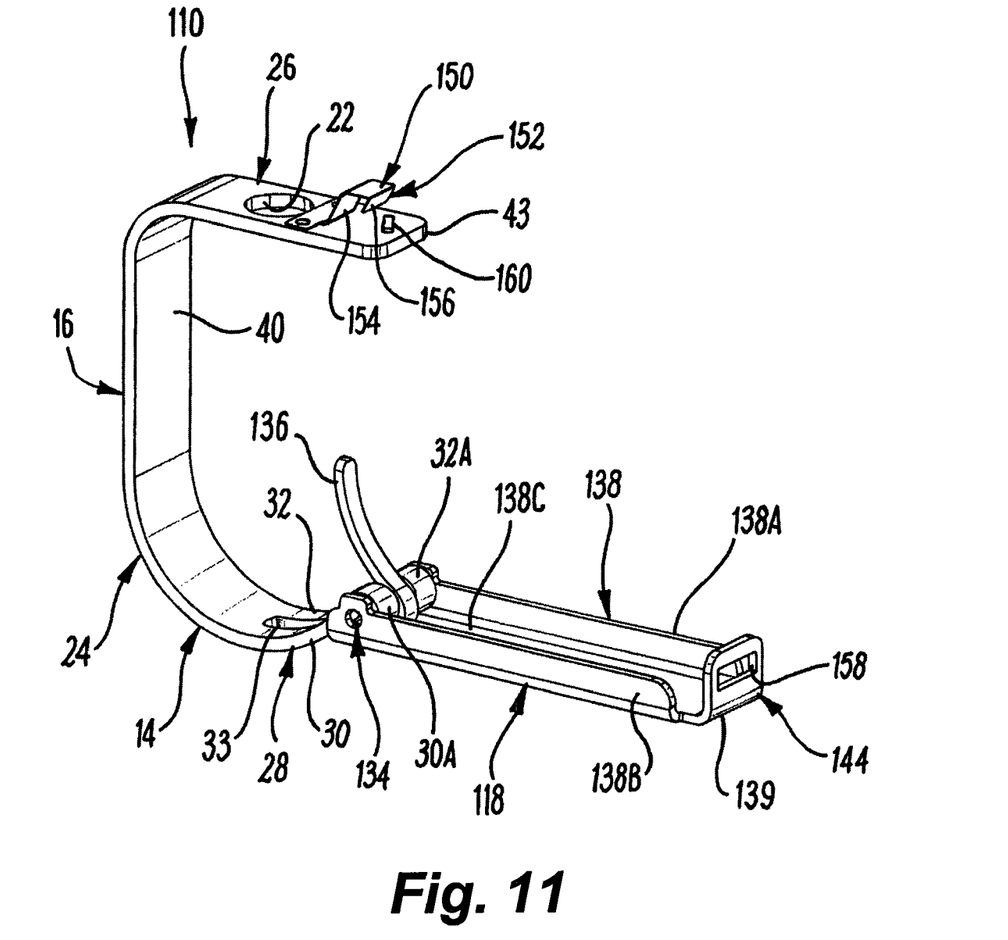
FIG. 11 is a perspective view of a second embodiment of a hanger for an elongate article, comprising first and second parts, the second part being in an open position.
Figure 12:
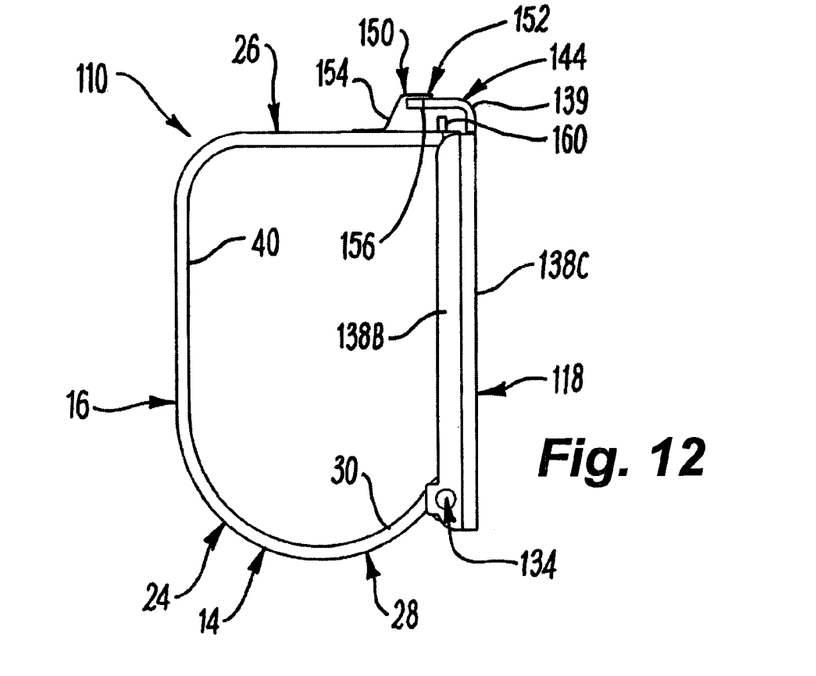
FIG. 12 shows a view similar to FIG. 11 with the second part in the closed position.
Figure 13:
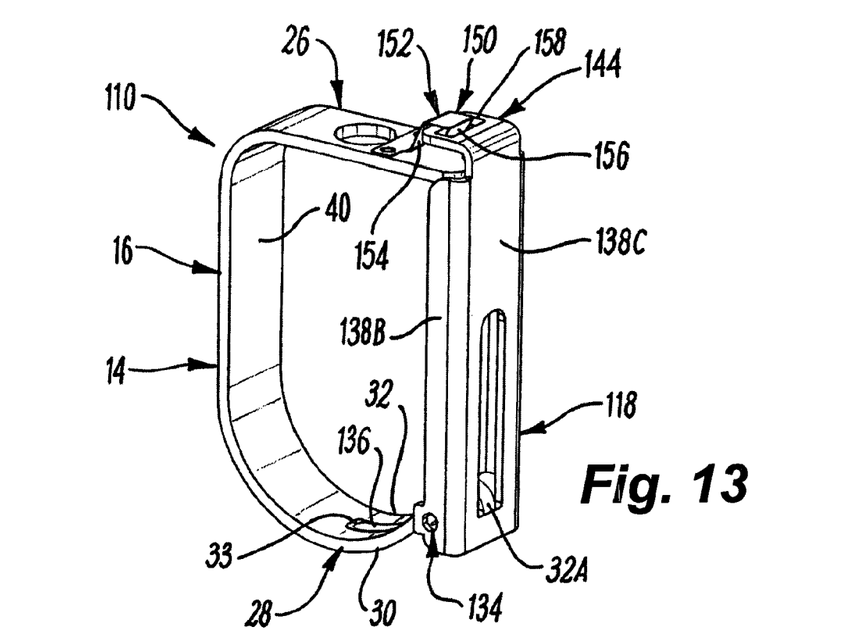
FIG. 13 is a front view of the second embodiment of the hanger with the second part in the closed position.
Figure 14:
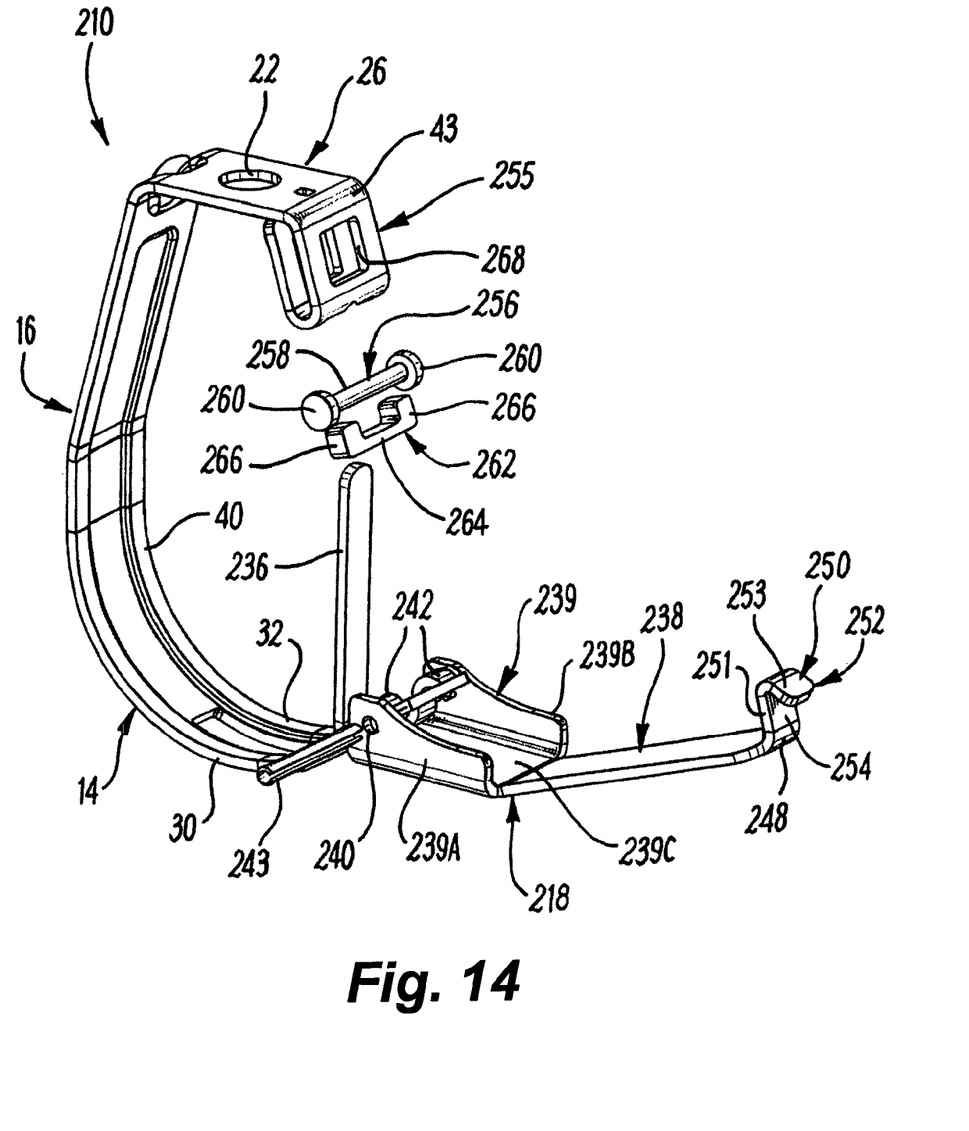
FIG. 14 is an exploded perspective view of a third embodiment of a hanger for an elongate article.
Figure 15:
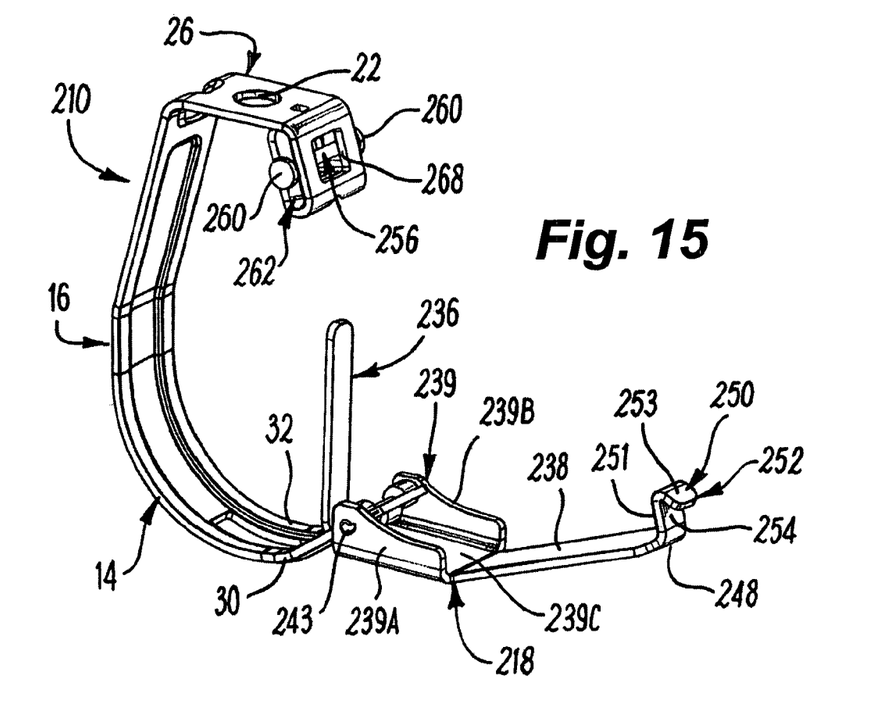
FIG. 15 shows a view similar to FIG. 11 with a second part in an open position.
Figure 16:
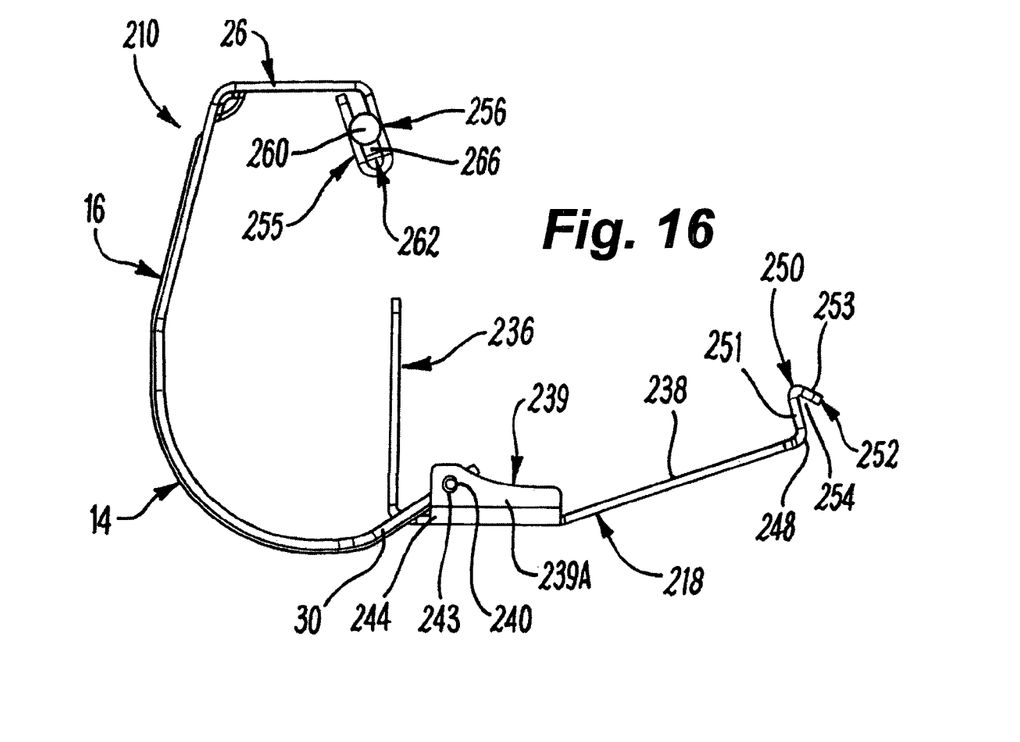
FIG. 16 is a side view of the third embodiment of the hanger with the second part in an open position.

A modification to the invention in the form of a second embodiment is shown in FIGS. 11 to 13. The second embodiment is in the form of a hanger 110 comprising a holding arrangement 14, The holding arrangement 14 comprises a first part 16 and a second part 118 pivotally attached to the first part 16. The holding arrangement 14 further include mounting means in the form of an aperture 22 to allow the hanger 110 to be mounted on a support, for example a strut in a roof.

The first part 16 of the hanger 110 includes many of the features of the hanger 10 shown in FIGS. 1 to 10, and these are designated with the same reference numerals as in FIGS. 1 to 10, and function in the same way.

The second part 118 of the hanger 110 is similar to the second part 18 of the hanger 10, but differs in that the second part 118 comprises a curved closing member 136 and a barrier member 138, the closing member 136 being in the form of a cut out portion from the barrier member 138. The closing member 138 is curved to correspond with the curvature of the forked receiving members 30, 32, and can fit flush into the gap 33 between the receiving members 32, 32 when the second part is in the closed position.

The barrier member 138 of the second part 118 is in the form of a channel section having opposite wall members 138A, 1386 and a base member 138C.

The second part 118 is pivotally attached to the first part 16 by a pivot arrangement 134. One end of each wall member 138A, 138B is pivotally attached to a respective one of the free end regions 30A, 32A of the receiving members 30, 32.

A suitable stop arrangement, similar to that described above, is provided to support the barrier member 138 in a horizontal position. Thus, the pipe (not shown in FIGS. 10 to 13) can be supported by the barrier member when the second part 16 is in the open position.

The second part 118 also includes a securable end region 139 at which a cooperating portion 144 is provided. The cooperating portion 144 forms part of a securing arrangement to secure the second part 118 in the closed position.

The securing arrangement further includes a detent member 150 mounted on the cross member 26 at the free end region 43 thereof. The detent member 150 is resiliently deformable and is in the form of a spring member.

The detent member 150 comprises a hook portion 152 and a connecting portion 154 to connect the hook portion 152 to the cross member 26. The hook portion 152 includes a downwardly extending lip 156. The cooperating portion 144 of the second part 118 defines an aperture 158 in which the downwardly extending lip 156 is received when the second part 118 is in the closed position (see FIG. 13.

When a pipe is held by the pipe hanger 110, the weight of the pipe elastically deforms the first part 16, thereby urging the article carrying portion 28 downwardly. This has the effect of also urging the second part 118 and the cooperating portion 144 downwardly.

The downward movement of the cooperating portion 144 may cause it to be released from the hook portion 150, i.e. so that the downwardly extending lip 156 is no longer received in the aperture 158. In order to prevent the second part 118 then moving to the opened position in such circumstances, a subsidiary securing member 160 is provided.

The subsidiary securing member 160 is in the form of an upstanding member, such as a pin, to interact with the cooperating portion 144 by being received in the aperture 158 defined therein. This secures the second part 118 in the closed position when the first part 16 is deformed by the weight of the pipe thereon.

The upstanding member 160 is offset from the detent member 150 towards the free end of the cross member 26. The upstanding member 160 is disposed on the cross member 26 at a position to be received in the aperture 158 of the cooperating portion 144 when the first part is deformed by the weight of the article thereon.

A third embodiment is shown in FIGS. 14 to 18. The third embodiment is in the form of a hanger 210 comprising a holding arrangement 14, The holding arrangement 14 comprises a first part 16 and a second part 218 pivotally attached to the first part 16. The holding arrangement 14 further include mounting means in the form of an aperture 22 to allow the hanger 210 to be mounted on a support, for example a strut in a roof.

The first part 16 of the hanger 210 includes many of the features of the hanger 10 shown in FIGS. 1 to 10, and these are designated with the same reference numerals as in FIGS. 1 to 10, and function in the same way.

The second part 218 of the hanger 210 is similar to the second part 18 of the hanger 10, but differs in that the second part 218 comprises an L shaped closing member 236 and a barrier member 238. The closing member 236 is configured to extend through the gap 33 between the forked receiving members 30, 32 of the first part 16 when the second part 218 is in the closed position.

The barrier member 238 of the second part 218 comprises a channel section 239 having opposite wall members 239A, 239B and a base member 239C. Each of the wall members 239A, 239B defines an aperture 240 to allow the barrier member 238 to be pivotally attached to the first part 16 at curved pivot members 242, each defining a respective recess. A split pin 243 extends through the apertures 240 and the recesses in the curved pivot members 242, thereby pivotally attaching the second part 218 to the first part 16.

A suitable stop arrangement, comprising the lower edges 244, 246 of the channel section 239, is provided to support the barrier member 238 in a horizontal position. The lower edges 244, 246 engage the forked receiving members 30, 32 when the barrier member 238 is in the open position shown in FIGS. 14, 15 and 16, thereby holding the barrier member 238 in the position shown in FIGS. 14, 15 and 16. Thus, the pipe (not shown in FIGS. 14 to 18) can be supported by the barrier member 238 when the second part 218 is in the open position.

The second part 218 also includes a securable end region 248 at which an engaging formation in the form of a hook member 250 is provided. The hook member 250 forms part of a securing arrangement to secure the second part 218 in the closed position.

The hook member 250 includes a carrying portion 251 and an urging portion 252 extending from the carrying portion 251. The urging portion 252 provides an upwardly facing urging surface 253, the purpose of which is described below. A recess 254 is defined between the carrying portion 251 and the urging portion 252. The recess 254 faces away from the space 40 when the second part 218 is in the closed position.

The securing arrangement further includes a retaining formation 255 at the free end region 43 of the cross member 26. The retaining formation 255 comprises a fold over portion at the free end region 43 of the cross member 26.

The securing arrangement further includes a movable elongate securing element 256, held within the retaining formation 225. The elongate securing element comprises a cylindrical main portion 258 and two opposite end flange portions 260, which prevent the securing element from falling out of the retaining formation 255.

The securing arrangement further includes a support member 262 to support the securing element 256 in the retaining formation 255. The support member 262 comprises a central portion 264 and two upstanding portions 266 at respective opposite ends of the central portion 264. The upstanding portions 266 engage the main portion 258 and support the securing element 256 in a position where the securing element 256 can co-operate with the hook member 250, as explained below.

The retaining formation 255 defines an aperture 268 through which the hook member 250 can be inserted when the second part 218 is moved to the closed position. On insertion of the hook member 250 through the aperture 268, the hook member 250 is received between the main portion 258 of the securing element 256 and the central portion 264 of the support member 262. Thus the urging surface 253 engages the main portion 258 of the securing element 256 and urges the securing element 256 upwardly.

Figure 17:
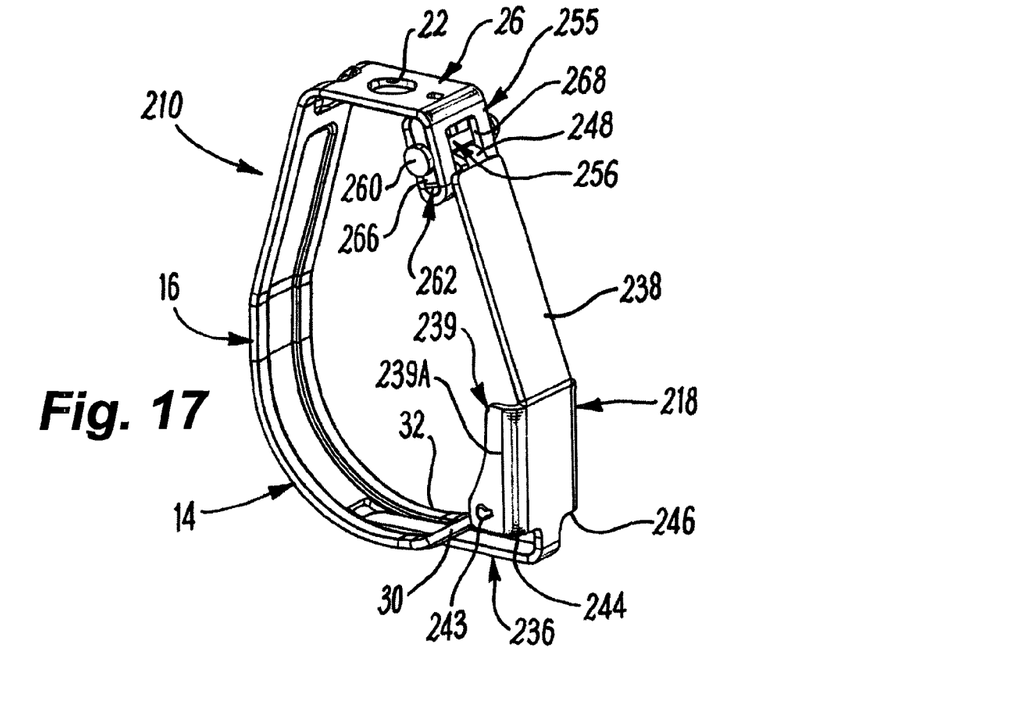
FIG. 17 shows a view similar to FIG. 11 with a second part in a closed position.
Figure 18:
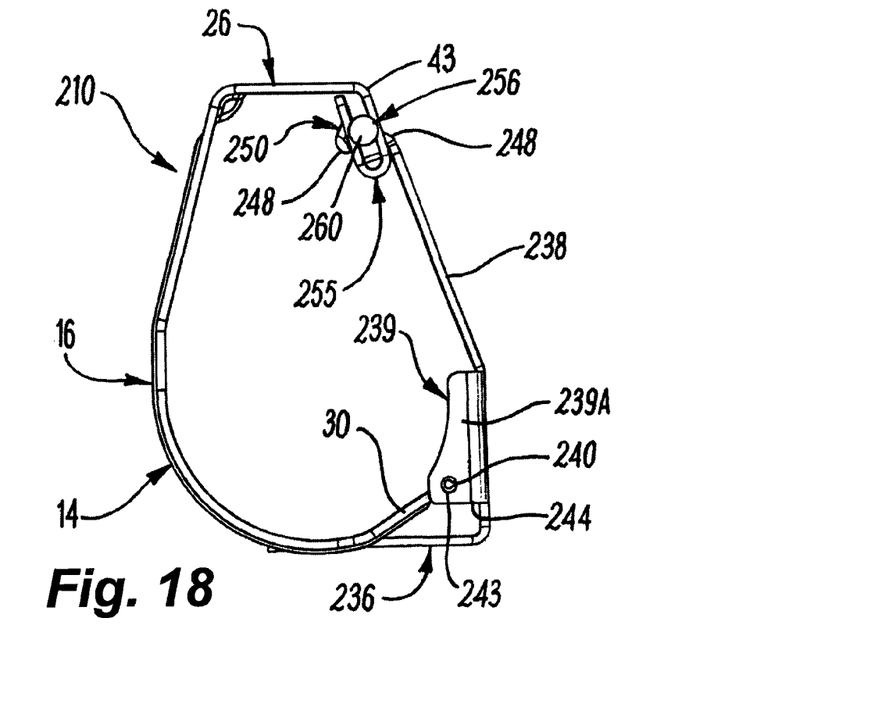
FIG. 18 is a side view of the third embodiment of the hanger with the second part in a closed position.

When the hook member 250 has moved beyond the securing element 256, as shown in FIGS. 17 and 18, the securing element 256 drops on the carrying portion 251 and is received in the recess 254, thereby securing the second part 218 in the closed position.

There are thus described embodiments of a hanger for an elongate article, such as a pipe which allows the pipe to be fed into the hanger 10, 110, 210 from the side, rather than being fed through lengthwise. The embodiments described herein provide the additional advantage that the pipe 12 can engage the closing member 36, 136, 236 and effect automatic closing of the barrier member 38, 138, 238 as the pipe 12 is moved into the space 40.

The invention claimed is:

1. A hanger for an elongate article, said hanger comprising: an article holding arrangement comprising a first part mountable on a support, and a second part movably connected to the first part, the second part being movable relative to the first part between open and closed positions, wherein the second part includes a closing member operable by the article to move the second part to the closed position; a securing arrangement for securing the second part in the closed position, the securing arrangement comprising an engaging formation on one of the first and second parts, and a movable securing element on the other of the first and second parts; wherein the securing arrangement further includes a retaining formation on said other of the first and second parts to hold the movable securing element, the movable securing element being slidably movable relative to the retaining formation between securing and non-securing positions on engagement by the engaging formation when the second part is moved to the closed position; whereby when the movable securing element is in the securing position, the movable securing element can co-operate with the engaging formation to secure the second part in the closed position; wherein the holding arrangement defines an article receiving space to receive the article therethrough, and an access opening to allow the article access to the article receiving space when the second part is in the open position, the second part comprising a barrier member to extend across the access opening when the second part is in the closed position; and wherein the closing member is provided on the barrier member, and the closing member extends transverse to the barrier member.

2. A hanger according to claim 1, wherein the first part defines the access opening, so that, when the second part is in the open position, the article can be moved through the access opening to be received in the article receiving space.

3. A hanger according to claim 1, wherein the first part includes a cross member on which the engaging formation or the movable securing element is provided, the cross member engaging the second part when the second part is in the closed position, and wherein the cross member has a free end region, and the engaging formation or the movable securing element is provided adjacent the free end region of the cross member.

4. A hanger according to claim 3, wherein the retaining formation is provided on the first part, and the movable securing element is provided on the second part.

5. A hanger according to claim 1, wherein the movable securing element is elongate, and has flange portions at opposite ends thereof to hold the securing element in the free end region of the cross member.

6. A hanger according to claim 1, wherein the retaining formation defines an aperture through which the engaging formation can extend to cooperate with the movable securing element when the second part is in the closed position.

7. A hanger according to claim 1, wherein the engaging formation includes an urging surface to engage the securing element and move the securing element to the non-securing position when the second part is moved to the closed position.

8. A hanger according to claim 1, wherein the engaging formation comprises a hook member to cooperate with the movable securing element when the second part is in the closed position.

9. A hanger according to claim 8, wherein the hook member defines a recess to receive the movable securing element, and wherein the recess faces away from the article receiving space when the movable securing element is received in the recess.

10. A hanger according to claim 1, wherein the securing arrangement includes a support member to support the movable securing element in a position so that the movable securing element can cooperate with the engaging formation.

11. A hanger according to claim 10, wherein the support member comprises a central portion and a respective upstanding member at each end of the central portion to engage the movable securing element.

12. A hanger according to claim 1, wherein the first part includes an article carrying portion defining a recess, the article carrying portion being configured to receive the closing member when the second part is in the closed position.

13. A hanger according to claim 12, wherein the article carrying portion comprises two forked members extending substantially parallel to each other, the closing member being received between the forked members when the second part is in the closed position.

14. A hanger according to claim 1, wherein the holding arrangement includes a stop member to hold the second part in the open position, said open position of the second part being a position at which the second part can support the article.

15. A hanger according to claim 1, wherein the second part is pivotally connected to the first part, so that the second part is pivotally movable between the open and closed positions.

16. A hanger for an elongate article said hanger comprising: an article holding arrangement comprising a first part mountable on a support, and a second part movably connected to the first part, the second part being movable relative to the first part between open and closed positions, wherein the second part includes a closing member operable by the article to move the second part to the closed position; a securing arrangement for securing the second part in the closed position; the securing arrangement comprising an engaging formation on one of the first and second parts, and a movable securing element on the other of the first and second parts; wherein the securing arrangement further includes a retaining formation on said other of the first and second parts to hold the movable securing element, the movable securing element being slidably movable relative to the retaining formation between securing and non-securing positions on engagement by the engaging formation when the second part is moved to the closed position; whereby when the movable securing element is in the securing position, the movable securing element can co-operate with the engaging formation to secure the second part in the closed position; and wherein the closing member comprises a lever operable by engagement of the article therewith to move the second part to the closed position.

17. A hanger for an elongate article, said hanger comprising: an article holding arrangement comprising a first part mountable on a support, and a second part movably connected to the first part, the second part being movable relative to the first part between open and closed positions, wherein the second part includes a closing member operable by the article to move the second part to the closed position; a securing arrangement for securing the second part in the closed position; the securing arrangement comprising an engaging formation on one of the first and second parts, and a movable securing element on the other of the first and second parts; and wherein the securing arrangement further includes a retaining formation on said other of the first and second parts to hold the movable securing element, the movable securing element being slidably movable relative to the retaining formation between securing and non-securing positions on engagement by the engaging formation when the second part is moved to the closed position; whereby when the movable securing element is in the securing position, the movable securing element can co-operate with the engaging formation to secure the second part in the closed position, wherein the second part includes the closing member; and wherein the closing member extends across the article receiving space when the second part is in the open position, whereby when the second part is in the open position, the closing member is positioned to engage the article when the article is moved into the space.

* * * * *